've# 2,936,295

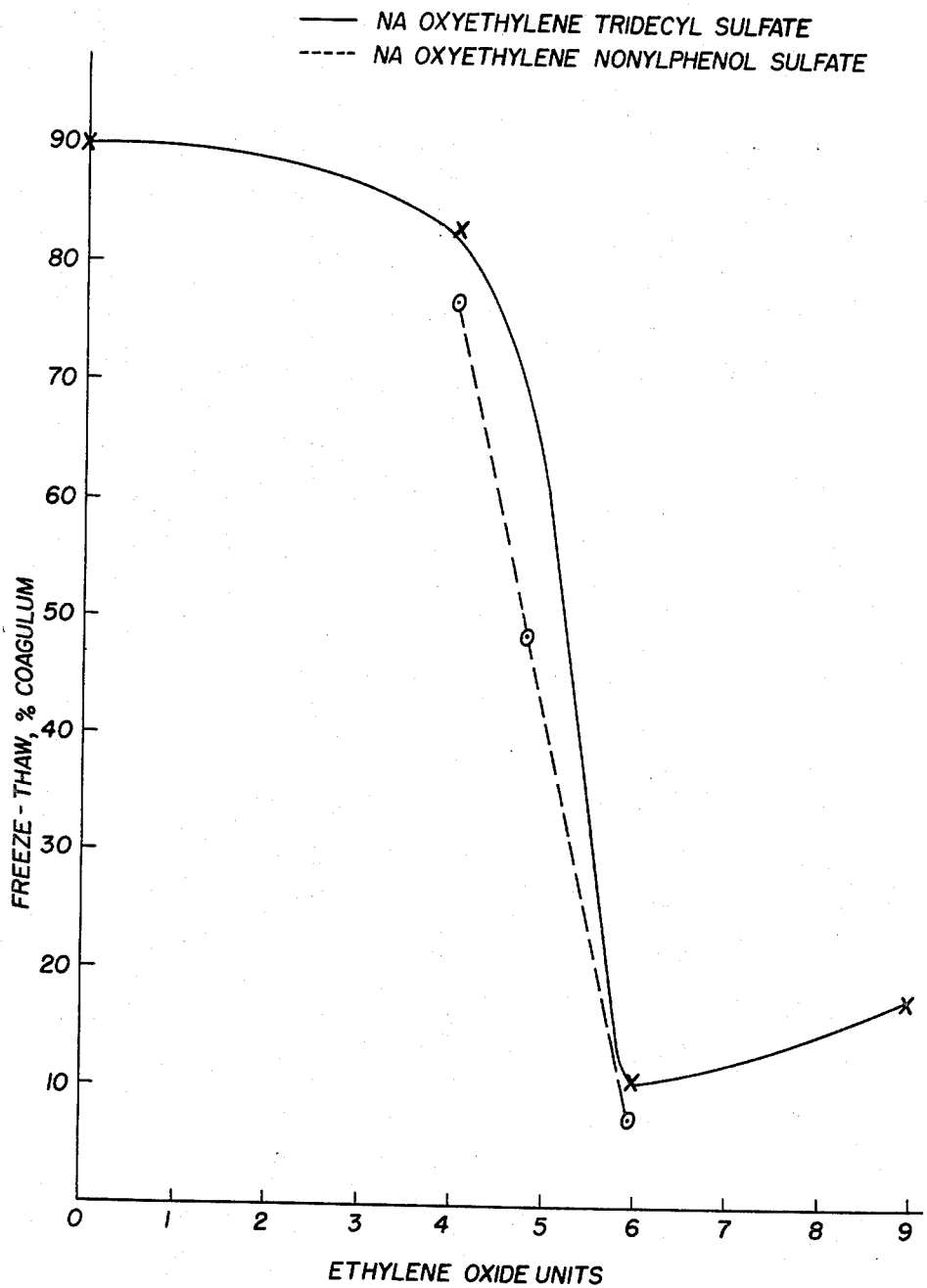

THERMAL AND MECHANICAL STABLE LATICES OF ISOOLEFIN-MULTIOLEFIN RUBBERY POLYMERS AND PROCESS FOR PREPARING SAME

Robert S. Brodkey, Roselle, and Alfred L. Miller, Cranford, N.J., assignors to Esso Research and Engineering Company, a corporation of Delaware Application June 22, 1956, Serial No. 593,163

14 Claims. (Cl. 260—29.7)

The present invention relates to an improvement in butyl latices. More particularly, it relates to improvements in the preparation of stable butyl rubber emulsions. Specifically, it relates to a highly stable butyl latex prepared by emulsifying butyl rubber with an organic sulfate containing one or more ethylene oxide units.

It has been known for some time that latices of high polymer materials may be produced by the emulsion polymerization technique. However, it is often desired to prepare emulsions from already prepared solid rubbery and resinous materials, such as those prepared by Friedel-Crafts catalyst polymerization techniques, which are not prepared according to the emulsion polymerization technique. Dispersions of these materials are generally prepared by working large amounts of dispersing agents, up to 50% or more based on the polymer, into the solid polymer, plus some water to give a thick water-rubber dispersion. This emulsion is then inverted to form a rubber-water dispersion. Because of the necessity of using an excessive amount of dispersing agent, which is undesirable for most uses, the solution technique is better adapted to large scale production. According to this method, the polymer is dissolved in a suitable solvent and the emulsifier and water are added while stirring. The solvent is then stripped from the resulting emulsion to form the aqueous latex. The latex may then, if desired, be concentrated, for example, by creaming, centrifuging or further heat stripping.

Latex, in a broad sense, is a colloidal water emulsion of a rubbery substance. Butyl latices are generally prepared by emulsifying a solution of butyl rubber in water by means of a salt, such as sodium or potassium oleate. Experience has shown that these latices are relatively unstable and tend to coagulate when subjected to mechanical stress. Mechanical instability may be brought about by the simple movement of an agitator stirring the colloid. Maintenance costs are increased because the equipment becomes coated with the coagulated rubber. Furthermore, an appreciable quantity of the rubber is lost, thus making the product economically unattractive.

Another type of instability encountered with conventional butyl latices is that they oil-out and develop coagulum during the stripping step. This is commonly referred to as processing instability. In some cases, as much as 50% of the latex may separate out after the solvent has been removed.

A third, and very important type of instability, is brought about by temperature change. When butyl latices are shipped from one place to another, they are frequently subjected to both warm and cold weather. This oscillation of the latex's ambient temperature may cause some of the rubber emulsion to coagulate. This property is hereinafter referred to as the freeze-thaw stability of the emulsion, and is measured by subjecting the latex to cyclic refrigeration and thawing and determining the quantity of coagulation formed. It is not unusual to have 100% rubber coagulate when a conventional butyl latex is so treated.

One of the objects of the present invention is to produce a butyl latex having unusually good freeze-thaw stability.

It has now been discovered that butyl latices having excellent freeze-thaw as well as mechanical and processing stability may be prepared by employing an organic anionic sulfate, containing at least one ethylene oxide unit, as the emulsifier.

Furthermore, it has also been found that adding small quantities of a monovalent salt of an ortho phosphate during the homogenization step produces an emulsion having freeze-thaw, mechanical and processing stability superior to that obtained with polyoxyethylene sulfate emulsifiers alone.

In accordance with the present invention, 100 parts by weight of butyl rubber dissolved in a solvent is dispersed in about 250 parts by weight of water containing about 1 to 20 phr (parts by weight per 100 parts by weight of rubber) of an emulsifier having the general formula:

$$R(OCH_2CH_2)_nOSO_3X$$

wherein R is aliphatic aryl, alkaryl or cyclic, n is 1 to 9, and X is a monovalent metal or radical.

Another embodiment of the present invention involves the addition of about 0.25 to 2 phr (parts by weight per 100 parts by weight of rubber) of a stabilizing agent which is a monovalent salt of an ortho phosphate.

The present invention will be best understood from the following description wherein reference is made to the drawing wherein the figure is a graph showing the relationship between the number of ethylene oxide units and the freeze-thaw stability of the butyl latex.

Before describing the invention in detail, the nature of the rubbery materials employed will be more particularly set forth.

Butyl rubber is the copolymer of isobutylene with a multiolefin prepared at low temperatures with a Friedel-Crafts catalyst. The major component of the copolymer is preferably isobutylene. The minor component is a multiolefin having from 4 to 12, or 14 carbon atoms. The preferred multiolefins are butadiene, isoprene, piperylene, dimethallyl, myrcene, allocymene and the like. Of these materials, isoprene is regarded as the most suitable multiolefin. The isobutylene and the multiolefin are mixed in the ratio of a major proportion of isobutylene and a minor proportion of isoprene, the preferred range being 1 to 10 parts isoprene and 99 to 90 parts isobutylene. High purity is desirable in both materials and it is preferable to use an isobutylene of at least 99% purity, although satisfactory copolymers can be made of materials of considerably lower purity. The mixture of monomers is cooled to a temperature within the range of between −40° C. and −164° C., the preferred range being between −78° C. and −103° C. The material may be cooled by the use of a refrigerating jacket upon the mixing tank and polymerizer, in which case any refrigerant which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane and liquid ethylene are satisfactory. In some instances, liquid methane may be employed, although usually the temperature of boiling liquid methane is undesirably low.

The cold mixture is then polymerized by the addition of a Friedel-Crafts catalyst, preferably in a liquid or dissolved form. Ordinarily an amount of catalyst ranging from 0.15% to about 1.0% of the weight of the mixed olefins is required to polymerize them into a high molecular weight polymer. A partial copolymerization may be obtained by limiting the quantity of catalyst added.

In the polymerization reaction, the liquid catalyst may be sprayed on to the surface of the rapidly stirred, cold olefinic material, or a small high pressured stream of catalyst may be directed into the body of the rapidly stirred mixture. In both processes powerful and efficient stirring is needed to disperse the catalyst into the mixture.

The polymerization proceeds rapidly to a yield of the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol, or some other compound, to inactivate the catalyst. The warm water serves the purpose of flashing off the excess refrigerant, the unpolymerized olefins and catalyst solvent. The polymer is then recovered from the water suspension by any convenient manner, such as straining or filtering, or otherwise as may be convenient. The polymer is then dried either as a blanket passing through a tunnel drier or on a mill.

The product is a plastic and elastic material. It has a Staudinger molecular weight within the range between about 35,000 and 90,000, the minimum useful molecular weight being about 20,000 and the preferred range between about 45,000 and 60,000. The rubber has a Wijs' iodine number between about 1 and 20, and a maximum iodine number of about 50, the preferred iodine number being about 7 to 15. The rubber materials may contain pigments, reinforcing agents, softeners, vulcanizers, accelerators, anti-oxidants, or other compounding ingredients.

In the practice of the present invention, the rubbery polymer is dissolved in a hydrocarbon solution, preferably an aliphatic hydrocarbon with 6 to 8 carbon atoms, e.g., hexane. The hydrocarbon solution is emulsified in the presence of water containing an emulsifier system. To perform this emulsification, mechanical work must be supplied to break down the hexane solution into particles colloidal in size. This mechanical action is aided to a considerable extent by the character of the emulsifier system in terms of its efficiency in reducing the surface tension between the oil and water phases and its ability to protect the newly formed colloidal particles from agglomeration to the other particles. Machines commonly used to supply this mechanical action would include high speed stirrers such as a Dispersator, high shear producing machines such as colloid mills and high pressure homogenizers, and shear production by sound energy such as the Rapisonic or Minisonic homogenizers.

The emulsifiers which may be used in accordance with the present invention are organic anionic sulfates containing at least 1 ethylene oxide unit. The following is a list of sulfates suitable for the purposes of this invention:

The sodium salts of nonylphenyl ether of polyoxyethylene sulfate, tridecyl ether of polyoxyethylene sulfate, and lauryl ether of polyoxyethylene sulfate, and the ammonium salts of nonylphenyl ether of polyoxyethylene sulfate and tridecyl ether of polyoxyethylene sulfate.

The addition of small quantities of an ortho phosphate salt, that is, about 0.25 to about 2 phr, improves the stability of the latex emulsion, particularly with respect to the processing stability. The effect of the stabilizing agent is not merely additive, since when used alone, it will not produce a stable emulsion. It is preferred that the stabilizer be used in an amount between about 0.5 and about 1.5 phr, and it is especially desirable to use about 1 to 1.5 phr of the ortho-phosphate salt.

In one embodiment of this invention the emulsion is prepared in a Minisonic homogenizer having a funnel, gear pump, bell, recycle line, rubber cement injection line and a mixer. The funnel is charged with water containing the emulsifier or emulsifier-stabilizer mixture. The aqueous solution is recycled by means of a gear pump for about 1 minute. During this operation, the liquid is pumped through an orifice and sprayed over a reed in the bell. It returns to the funnel by means of a recycle line. After about 1 minute of recycling, the rubber cement, which is generally a hydrocarbon solution containing about 15 to 35% by weight butyl rubber, is introduced to the homogenizer through a line which terminates just above the gears of the pump. The coarse emulsion formed in the pump is sprayed through an orifice and converted to a fine emulsion by the sonic cavitation produced by the reed. The emulsion is recycled for about 6 to 30 minutes, generally about 12 minutes, before it is withdrawn from the homogenizer and stripped of the hydrocarbon solvent.

The stripping operation may be carried out at elevated temperatures and atmospheric pressures until no more solvent can be removed. If a high solids latex is desired, vacuum stripping of water may be employed. Because foaming may occur during this step in a process, the latex is sometimes diluted with stripped or partly stripped latex, or an anti-foaming agent, such as Dow Anti-Foam A Emulsion, which is a poly-silicone oil, may be added just prior to the solvent removal step.

The amount of water contained in the emulsion is not critical as long as there is enough water present to produce a stable water-reducible emulsion. Accordingly, therefore, for shipping purposes, the most desirable form of emulsion is a concentrated emulsion. The water may be increased at the time of application by adding whatever water is desired to provide a good working consistency.

In the practice of the present invention, about 200 to 300 cc. of water containing from about 1 to 20 phr of an organic anionic sulfate containing at least 1 ethylene oxide unit, for example, sodium salt of nonylphenyl ether polyoxyethylene sulfate with 4-ethylene oxide units, is charged into the homogenizer's funnel and recycled for about 1 minute to insure a uniform solution. 100 parts by weight of butyl rubber dissolved in a suitable solvent, such as hexane, is injected into the homogenizer over a 2-minute period. The cement, as it is commonly called, is usually about a 20% by weight solution of butyl rubber. The crude rubber cement emulsion produced during the 2 minute injection period is then recycled for an additional 12 minutes. In some cases, the additional time is as long as 25 minutes and as brief as 6 minutes. The emulsion may be withdrawn by lowering the open end of the recycle line to a point below the level of the liquid in the funnel and allowing the emulsion to drain from the homogenizer.

Where added stability is desired, it is best to add a stabilizer to the water prior to or during the addition of the butyl rubber. For example, about 0.25 to 2 phr of a salt of an orthophosphate may be added to the water and recycled with the emulsifier for about 1 minute prior to the addition of the rubber solution or cement.

A small quantity of anti-foaming agent may be added to the emulsion at this point in the process, that is, after emulsification, to prevent excess foaming during the stripping step which follows. The solvent may be stripped from the emulsion by any suitable means, for example, it may be heated at atmospheric pressure until all of the removable solvents have distilled off. If desired, the distillation may be effected under reduced pressure. The resulting butyl latex has excellent freeze-thaw and mechanical stability properties.

The latices produced by this procedure contain between about 20 to 40% by weight total solids. This product may be concentrated by the removal of water to a solution containing about 60% by weight solids or it may be diluted to a solution containing about 5% by weight solids. The composition of these butyl latices is as follows:

| Ingredients | Parts by Weight on Total | |
|---|---|---|
| | Range | Preferred |
| Butyl Rubber | 18 to 60 | 30 to 50 |
| Monovalent Salt of Anionic polyoxyethylene Sulfate | 0.4 to 12 | 1 to 3 |
| Monovalent Salt of Dihydrogen Orthophosphate | 0 to 1.2 | 0 to 1 |
| Anti-Foaming Agent | 0 to 0.05 | 0.005 |
| Water | Balance | Balance |

These latices may or may not contain a stabilizer depending on the degree and kind of stabilization desired.

The stability of the butyl latices prepared according to the foregoing description was determined by the following techniques. The mechanical stability of each latex was measured by means of a high speed Hamilton-Beach mixer model #33. In each case, the sample was diluted with water to form an emulsion having 10% by weight total solids. The diluted sample was then subjected to high speed mixing for 3 minutes. The stirrer shaft, which was about 0.25 inch in diameter, had a disk about 0.8 inch in diameter attached to its lower end. It was rotated at about 22,000 r.p.m. The test bottle was a pear-shaped glass container positioned such that the stirrer shaft was concentric with the axis of the bottle and its stirrer disk was about ½ inch above the inside bottom of the container. Following the 3-minute agitation period, each sample was allowed to stand for 5 minutes at room temperature before it was filtered through a 46 mesh screen. The screen was then dried by a suitable means, for example, under an infrared lamp, and weighed. The coagulant formed during the stirring operation was expressed in terms of weight percent coagulant.

The freeze-thaw stability test involved subjecting the latex to 3 temperature cycles. The temperature was fluctuated by means of a refrigerator which cooled the sample for about 8 hours to 18° F., and then permitted the sample to warm up to room temperature during the next 16 hours. This cycle was repeated 3 times and the quantity of coagulated rubber was determined and reported as weight percent coagulum.

The emulsions prepared according to the present invention have excellent freeze-thaw stability. This is most unusual because conventional emulsifiers, such as those prepared with potassium oleate, generally produce latices having very poor freeze-thaw stability. Furthermore, it has been found that anionic sulfates having between about 2 and 9 ethylene oxide units, and especially those having about 3 to 9 ethylene oxide units, have the ability to produce emulsions with extraordinary thermal stability.

Process stability measures the effect of stripping the latex of solvent and/or water, and is generally expressed in terms of weight percent flocculation. This test determines the total rubber which coagulates or oils out after emulsion is complete. It is measured by first allowing the butyl rubber emulsion to stand overnight (16 to 20 hours) at room temperature. Any coagulated rubber formed during this period is removed, dried and weighed. Then the rest of the emulsion is stripped of solvent at atmospheric pressure and elevated temperature and allowed to cool before being filtered through cheesecloth. The coagulated rubber is dried and weighed. The value is expressed as weight percent coagulant and is referred to as the "stripping floc." When this value is combined with the value obtained when the emulsion stood overnight, it is referred to as the total "processing floc."

Another test is a visual one. It involves examining the emulsion after the stripping step to see whether or not the emulsion has a skin or a concentrated rubbery layer. This skin, though undesirable because of its appearance, is readily reconstituted.

The advantages of this invention will be better understood from a consideration of the following experimental data and the drawing which are given for the sake of illustration, but without intention of limiting the invention thereto.

EXAMPLE 1

The following experiment was conducted to determine whether organic sulfates containing ethylene oxide units will produce stable butyl rubber latices. In one of these experiments 100 parts by weight of butyl rubber, dissolved in hexane (20% by weight), was dispersed in about 250 cc. of water containing 3.5 phr sodium salt of nonylphenyl ether of polyoxyethylene sulfate which had about 4 ethylene oxide units. The cement solution was injected over a one-minute period and the mixture was recycled for an additional 12 minutes. The emulsion was then stripped of hexane at an elevated temperature and atmospheric pressure. The resulting butyl latex was evaluated for mechanical, freeze-thaw and processing stability.

TABLE I

Properties:
    Stripping floc, percent _____ 1.1
    Total floc, percent _____ 13.7
    Mechanical stability, percent _____ 0.1
    Freeze-thaw stability, percent _____ 34.8
    pH of latex product _____ 7.7
    Visual inspection _____ Skin In another experiment the procedure outlined above was repeated with the exception that 5 phr of the sodium salt of tridecyl ether of polyoxyethylene sulfate, which also contained about 4 ethylene oxide units, was employed. The results were as follows:

TABLE II

Properties:
    Stripping floc, percent _____ 18.5
    Total floc, percent _____ 19.4
    Freeze-thaw stability, percent _____ 0.6

The above data demonstrate that polyoxyethylene sulfates are excellent emulsifiers for butyl rubber. While the processing and mechanical stabilities of the latices were very good, the freeze-thaw stability of the nonylphenyl ether derivative was only moderately improved. This is based on the fact that conventional butyl latices form about 80% coagulum when subjected to the same freeze-thaw conditions.

Thus, it has been shown that polyoxyethylene sulfates having between about 10 and 18 carbon atoms, in addition to those in the ethylene oxide groups, may be used to produce stable butyl rubber latices. This is particularly true of $C_{12}$ to $C_{16}$ sulfates, such as the tridecyl and nonylphenyl ether derivatives.

EXAMPLE 2

A group of experiments were undertaken to determine what effect various salts would have on the stabilization of butyl latices prepared with organic sulfates having more than 3 ethylene oxide units. In each case 5 phr of sodium salt of nonylphenyl ether of polyoxyethylene sulfate and 1 phr of salt were dissolved in water and used to emulsify a butyl rubber cement according to the procedure outlined above. The emulsions were evaluated for the following properties:

TABLE III

| Property | No Salt | $NaH_2PO_4$ | $Na_4P_2O_7$ | $Na_2B_4O_7$ |
|---|---|---|---|---|
| Stripping Floc, Percent | 1.1 | 3.5 | 4.1 | 7.8 |
| Total Floc, Percent | 13.7 | 6.3 | 8.0 | 8.3 |
| Mechanical Stability, Percent | 0.1 | 0.1 | 0.1 | |
| Freeze-Thaw | 34.8 | 0.1 | 35 | 24 |
| pH of Product | 7.7 | 6.0 | 9.0 | 8.9 |

The results show that while other salts increase stability, the orthophosphate is the most effective emulsion stabilizing agent. It is particularly effective in increasing freeze-thaw stability of the nonyl derivative which, as the data in Table III shows, produces a latex having a relatively low freeze-thaw stability. Latices having a high freeze-thaw stability are very attractive to producers who must expose their product to both high and low temperatures.

EXAMPLE 3

Further experiments were carried out to determine the effect of varying the quantity of orthophosphate added to the water solution prior to injecting the cement. In each case small amounts of sodium dihydrogen orthophosphate were dissolved in the aqueous solution together with 3.5 phr of sodium salt of nonylphenyl ether of polyoxyethylene sulfate which contained about 4 ethylene oxide units. The stability of the emulsions was evaluated.

TABLE IV

*The effect of various quantities of stabilizer on butyl rubber latex stability*

| phr or $NaH_2PO_4$ | 0 | 0.5 | 1.0 | 1.25 | 1.5 | 2.0 |
|---|---|---|---|---|---|---|
| Stripping Floc, Percent | 1.1 | 4.6 | 3.5 | 0.6 | 2.6 | 0.8 |
| Total Floc, Percent | 13.7 | 5.1 | 6.3 | 2.7 | 3.7 | 3.6 |
| Mechanical Stability, Percent | 0.1 | 0.2 | 0.1 | 0.0 | 0.1 | 0.0 |
| Freeze-Thaw Stability, Percent | 34.8 | 3.7 | 0.1 | 11.2 | 12.7 | 3.7 |
| pH of Latex Product | 7.7 | 6.1 | 6.0 | 6.0 | 5.7 | 5.7 |
| Visual Inspection | Skin | Skin | Skin | Skin | Skin | Skin |

These data illustrate the improved stability obtained when small amounts, about 0.25 to 2 phr, of an orthophosphate are used to stabilize the emulsion. The stabilizer is especially effective in enhancing the freeze-thaw stability. It reduced the coagulum formed from about 35 to 0.1 weight percent at the 1.0 phr level.

EXAMPLE 4

Another experiment was undertaken to determine the effect of varying the quantity of a sodium salt of nonylphenyl ether of polyoxyethylene sulfate, containing about 4 ethylene oxide units, on the emulsion's stability. In this example the quantity of sodium dihydrogen orthophosphate was maintained at the level of 1 phr, while the quantity of emulsifier was varied between 3.5 and 7.0 phr.

TABLE V

*Effect of various quantities of emulsifier on butyl rubber latex stability*

| Emulsifier, phr | 3.5 | 5.0 | 7.0 |
|---|---|---|---|
| Stripping Floc, percent | 3.6 | 2.1 | 2.3 |
| Total Floc, percent | 6.3 | 2.6 | 2.4 |
| Mechanical Stability, percent | 0.1 | 0 | 0 |
| Freeze-Thaw Stability, percent | 0.1 | 0.7 | 0.9 |
| pH of Latex Product | 6.0 | 6.0 | 6.0 |
| Visual Inspection | Skin | Skin | Heavy Skin |

These data shown that while higher amounts of emulsifier marginally improve the processing floc, they have little effect on the other stabilities of the latex. Thus, though it is desirable to use between about 2 and 7 phr of emulsifier, and it is especially preferred to use between about 3.5 and 7 phr.

EXAMPLE 5

In this experiment 3.5 phr of another polyoxyethylene sulfate, namely sodium salt of tridecyl ether of polyoxyethylene sulfate, containing about 6 ethylene oxide units was combined with 1 phr of sodium dihydrogen orthophosphate to make a butyl latex. The procedure was the same as that set forth above, except that 0.27 phr of an anti-foaming agent known as Nalco 71–SU, which is a mixture of natural and synthetic high molecular weight esters and oils, was added during the stripping operation.

TABLE VI

Properties:
Stripping floc, percent _____ 2.8
Total floc, percent _____ 3.8
Mechanical stability, percent _____ 17
Freeze-thaw stability, percent _____ 5
pH of latex product _____ 6.0
Visual inspection _____ Heavy skin The results demonstrate that highly stable emulsions may be obtained by combining a tridecyl ether of polyoxyethylene sulfate emulsifier, having about 6 ethylene oxide units, with a dihydrogen orthophosphate stabilizer. The latices produced have excellent processing and freeze-thaw stabilities, as well as good mechanical stability.

EXAMPLE 6

An experiment similar to Example 4 was conducted to determine what levels of the sodium salt of tridecyl ether of polyoxyethylene sulfate (about 6 ethylene oxide units) produce the most stable latices.

TABLE VII

*Effect of various quantities of emulsifier on butyl rubber latex stability*

| Properties<br>Sodium Salt of Tridecyl Ether of Polyoxyethylene, phr | 3.5 | 5 | 7 |
|---|---|---|---|
| Stripping Floc, Percent | 1.6 | 2.5 | 2.1 |
| Total Floc, Percent | 1.7 | 2.7 | 2.2 |
| Mechanical Stability, Percent | 7 | 15 | 3 |
| Freeze-Thaw Stability, Percent | 2.3 | 0.4 | 0.3 |
| pH of Latex Product | 6 | 6 | 6 |
| Visual Inspection | Skin | Clear | Clear |

These data show that, under the conditions of this experiment, excellent stability is obtained where the level of emulsifier is between about 3.5 to 7 phr. This is particularly true where mechanical stability is concerned.

EXAMPLE 7

Anionic sulfates containing different numbers of ethylene oxide units were compared to see if there is a relationship between the number of ethylene oxide units and the stability of the latex. Each latex was prepared according to the procedure outlined in the practice of this invention. 5 phr of each emulsifier and 1 phr of sodium dihydrogen orthophosphate were used to prepare each butyl latex. The freeze-thaw, mechanical and processing stabilities of each emulsion were as follows:

TABLE VIII

*Effect of the number of ethylene oxide units on latex stability*

| | Approx. No. of Ethylene Oxide Units | Latex Stability Properties | | |
|---|---|---|---|---|
| | | Freeze-Thaw | Mechanical | Processing |
| Sodium Salt of Nonylphenyl Ether of Polyoxyethylene Sulfate. | 4 | 77 | 0.1 | 6 |
| | 5 | 49 | 0.2 | 11 |
| | 6 | 7 | 0.7 | 4 |
| Sodium Tridecyl Sulfate | 0 | 90 | 7 | 6 |
| Sodium Salt of Tridecyl Ether of Polyoxyethylene Sulfate. | 4 | 83 | 24 | 5 |
| | 6 | 11 | 5 | 3 |
| | 9 | 18 | 19 | 3 |

These data expressed as weight percent coagulum, illustrate the critical relationship between the number of ethylene oxide units and the stability of butyl latex. The drawing is a plot of the freeze-thaw results presented above. The critical area seems to be above about 3 ethylene oxide units and for this reason the emulsifier should have at least 3 units. It is preferred to use sulfates having between about 3 and 9 ethylene oxide units and it is especially preferred that they have between about 4 and 9 units.

EXAMPLE 8

Tests made with the ammonium salts of tridecyl ether of polyoxyethylene sulfate (about 6 ethylene oxide units) and nonylphenyl ether of polyoxyethylene sulfate (about 4 ethylene units) indicated that while the latices formed have excellent mechanical and processing stability, the freeze-thaw stability is somewhat less than that obtained with the corresponding sodium salt. For example, when 3.5 phr of ammonium salt of tridecyl ether of polyoxyethylene sulfate was combined with 1 phr of sodium dihydrogen orthophosphate to emulsify a 20% by weight butyl rubber hexane solution, the stripping floc was 2.0 weight percent; the total floc was 2.8 weight percent; the mechanical stability was 17 weight percent; and the freeze-thaw stability was 13 weight percent. The sodium salt, under the same conditions, had a freeze-thaw stability of 5 weight percent.

In another test, where 3.5 phr of the ammonium salt of nonylphenyl ether of polyoxyethylene sulfate was combined with 1 phr of sodium dihydrogen orthophosphate to emulsify a 20% by weight butyl rubber hexane solution, the stripping floc was 2.2 weight percent; the total floc was 6.4 weight percent; the mechanical stability was 0.2 weight percent and the freeze-thaw stability was 25 weight percent, while that produced with the sodium salt of the same emulsifier, under the same conditions, had a freeze-thaw stability of 0.1 weight percent.

In summary, therefore, it has been found that certain combinations of an alkali metal, amine or ammonium salt of organic ethers of polyoxyethylene sulfate, having more than one ethylene oxide group, either alone or in combination with an alkali metal, amine or ammonium salt of an orthophosphate, especially dihydrogen orthophosphate, produce butyl rubber latices having excellent freeze-thaw, mechanical and processing stabilities. The sodium salt of the sulfate and stabilizer is preferred. In accordance with this invention, about 1 to about 20 phr, and preferably about 2 to 7 phr of an alkali metal, amine or ammonium salt of an organic ether of polyoxyethylene sulfate, either alone or in combination with an alkali metal, amine or ammonium salt of an orthophosphate, is used to emulsify butyl rubber in an aqueous system. An especially preferred embodiment of the present invention is where about 3.5 to 7 phr of organic ether of polyoxyethylene sulfate, having between 4 and 9 ethylene oxide units and a $C_{12}$ to $C_{16}$ alkyl group attached to it, is combined with about 1.0 to 1.5 phr of dihydrogen orthophosphate to emulsify the rubber.

The latices obtained in accordance with this invention are suitable for use in the preparation of foam rubber sponge extenders, paper size, paper shades and drapes, tire cord coating compositions, emulsion paints, laminants for paper, wood, canvas and plywood, binder for cork, wood, fiber and leather buffings, industrial gloves and protective clothing, dipped goods and adhesives.

In the appended claims it is intended to claim all novelty inherent in the invention as well as all modifications coming within the scope and spirit of the invention.

What is claimed is:

1. A process for preparing a stable rubber latex containing between 20 and 40% rubber solids, which comprises (1) emulsifying 100 parts by weight of a low unsaturated rubbery copolymer of a major proportion of isobutylene and a minor proportion of a conjugated diolefin having from 4 to 8 carbon atoms in sufficient water to yield 20-40% rubber solids and in the presence of 1 to 20 parts by weight of an emulsifier, based on the copolymer, said emulsifier having the general formula $R(OCH_2CH_2)_nOSO_3X$ where R is a radical chosen from the group consisting of alkyl, aryl, and alkaryl containing 10-18 carbon atoms, n is 4 to 9, and X is a monovalent radical chosen from the group consisting of alkali metal and ammonium salts; (2) concentrating the emulsion; and (3) recovering a stable rubber latex.

2. Process according to claim 1 in which the amount of emulsifier is between 2 and 7 parts by weight.

3. Process according to claim 1 in which the emulsifier is an alkali metal tridecyl sulfate having between 4 and 9 ethylene oxide units.

4. Process according to claim 1 in which the emulsifier is a nonylphenyl ether sulfate having between 4 and 9 ethylene oxide units.

5. A process according to claim 1 in which the emulsifier is an ammonium tridecyl ether sulfate having between 4 and 9 ethylene oxide units.

6. A process according to claim 1 in which the emulsifier is an ammonium nonylphenyl ether sulfate having between 4 and 9 ethylene oxide units.

7. A process for the preparation of a stable rubber latex which comprises (1) emulsifying 100 parts by weight of a low unsaturated rubbery copolymer of a major proportion of an isoolefin and a minor proportion of a multiolefin, said polymer having an iodine number between about 1 and 50 and being emulsified in an aqueous system containing about 0.25 to 2 parts by weight of a sodium salt of dihydrogen orthophosphoric acid and about 1 to 20 parts by weight of an emulsifier, based on the copolymer, said emulsifier having the general formula $R(OCH_2CH_2)_nOSO_3X$ where R is a radical chosen from the group consisting of alkyl, aryl, and alkaryl containing 10-18 carbon toms, n is 4 to 9, and X is a monovalent radical chosen from the group consisting of alkali metal and ammonium salts; (2) concentrating the emulsion; and (3) recovering a stable rubber latex.

8. Process according to claim 7 in which the emulsifier is an alkali metal tridecyl sulfate having between 4 and 9 ethylene oxide units.

9. Process according to claim 7 in which the emulsifier is a nonylphenylether sulfate having between 4 and 9 ethylene oxide units.

10. A process according to claim 7 in which the emulsifier is an ammonium tridecyl ether sulfate having between 4 and 9 ethylene oxide units.

11. A process according to claim 7 in which the emulsifier is an ammonium nonylphenyl ether sulfate having between 4 and 9 ethylene oxide units.

12. A process for preparing a stable synthetic rubber latex which comprises (1) emulsifying 100 parts by weight of a rubbery copolymer of a major proportion of isobutylene and a minor proportion of a conjugated diolefin having an iodine number between about 1 and 50 in an aqueous system containing about 3.5 to 7 parts by weight of an emulsifier, based on the copolymer, said emulsifier having the general formula $$R(OCH_2CH_2)_nOSO_3X$$

where R is a radical chosen from the group consisting of alkyl, aryl, and alkaryl and containing 10-18 carbon atoms, n is 4 to 9, and X is a monovalent radical chosen from the group consisting of alkali metal and ammonium salts; (2) concentrating the emulsion; and (3) recovering a stable rubber latex.

13. A stable latex composition comprising in parts by weight:

| | |
|---|---|
| Rubbery copolymer of isobutylene and a diolefin having between 4 and 8 carbon atoms, said copolymer having an iodine number between 1 and 50 | 18–60 |
| An emulsifier having the formula $R(OCH_2CH_2)_nOSO_3X$ where R is a radical chosen from the group consisting of alkyl, aryl, and alkaryl containing 10-18 carbon atoms, n is 4 to 9, and X is a monovalent radical chosen from the group consisting of alkali metal and ammonium salts | 0.4–12 |
| Water | 81.6–28 |

14. A stable latex composition comprising an aqueous emulsion containing 100 parts by weight of a low unsaturated copolymer of isobutylene and a diolefin having 4 to 8 carbon atoms, said copolymer having an iodine number below 50 and a Staudinger molecular weight above about 20,000, about 0.25 to 2 parts by weight of a sodium dihydrogen orthophosphate, and about 1 to 20 parts by weight of an emulsifier having the general formula $R(OCH_2CH_2)_nOSO_3X$ where R is a radical chosen from the group consisting of alkyl, aryl, and alkaryl containing 10–18 carbon atoms, $n$ is 4 to 9, and X is a monovalent radical chosen from the group consisting of alkali metal and ammonium salts.

References Cited in the file of this patent

UNITED STATES PATENTS

| | | |
|---|---|---|
| 2,213,477 | Steindorff et al | Sept. 3, 1940 |
| 2,375,140 | Semon | May 1, 1945 |
| 2,444,801 | Arundale | July 6, 1948 |
| 2,446,115 | Svendsen | July 27, 1948 |
| 2,769,711 | Wilson | Nov. 6, 1956 |